March 25, 1941. R. C. RUSSELL 2,236,355
NO-NEUTRAL SHIFT DEVICE
Filed Jan. 26, 1940 2 Sheets-Sheet 1
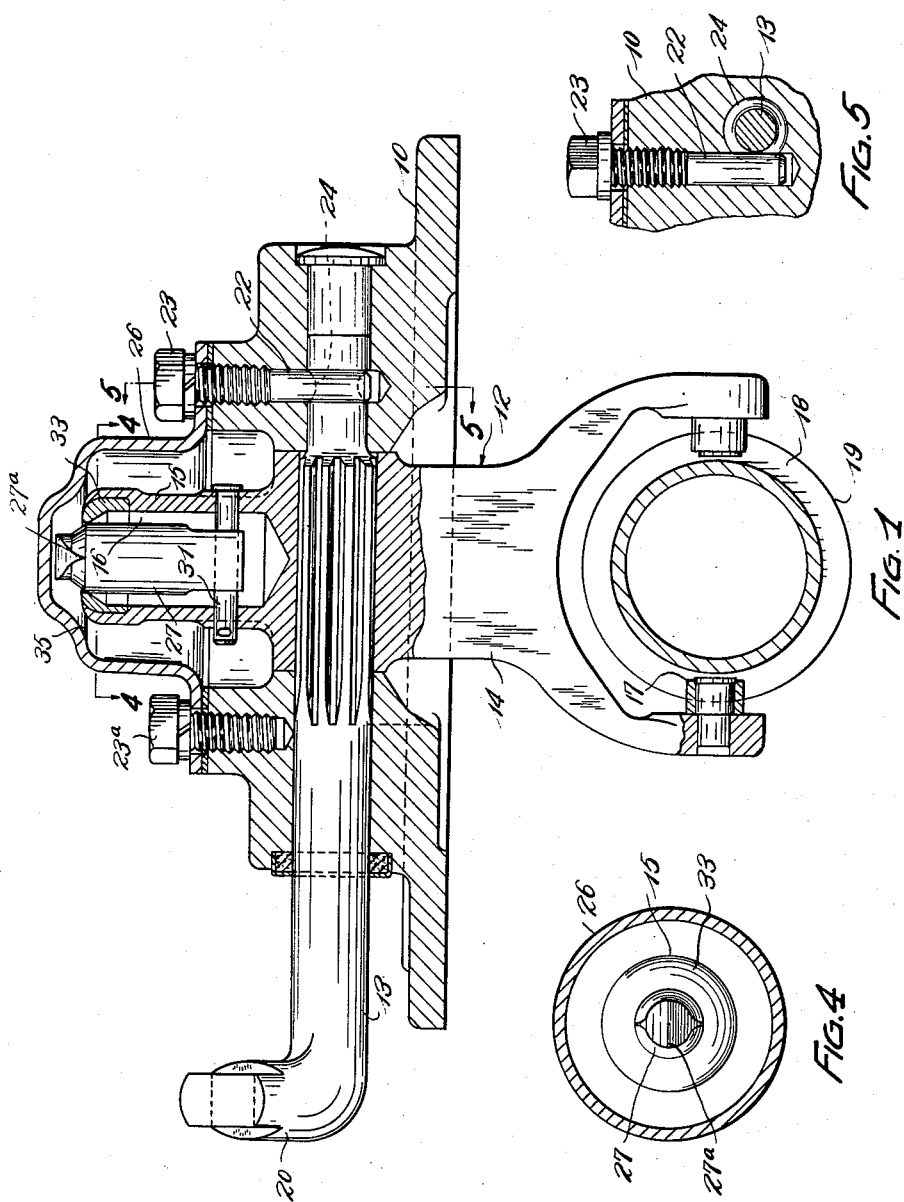
INVENTOR.
ROBERT C. RUSSELL
BY
Kwis Hudson Kent
ATTORNEYS

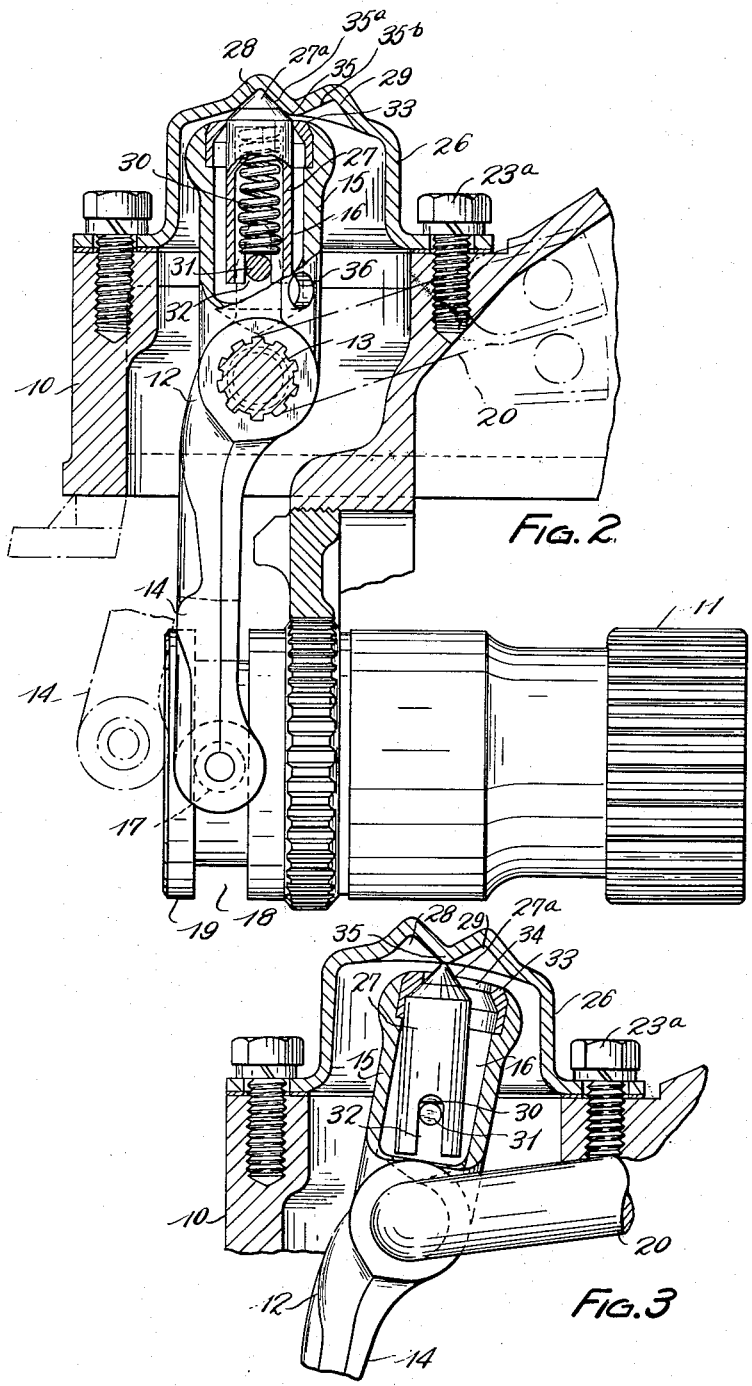

Patented Mar. 25, 1941

2,236,355

UNITED STATES PATENT OFFICE 2,236,355

NO-NEUTRAL SHIFT DEVICE

Robert C. Russell, Shaker Heights, Ohio, assignor to Eaton Manufacturing Company, Cleveland, Ohio, a corporation of Ohio Application January 26, 1940, Serial No. 315,798

5 Claims. (Cl. 74—475)

This invention relates to shift devices for shifting a gear or other part from one position to another, and as its principal object aims to provide an improved device of this character which is well suited for shifting the gear of a two-speed axle from one available setting to another and which acts to urge the gear toward full engagement in one of its available settings and prevents the gear from being left in a neutral or partially engaged position by the operator.

Another important object of my invention is to provide an improved shift device for actuating the gear of a two-speed axle, or other shiftable member, which acts to impose a load to yieldingly resist the shifting of such gear by the operator until the gear has been partially engaged, thus enabling the operator to maintain a desired "feel" or control over the shift and thereby prevent a sudden or jerky engagement.

Still another object of my invention is to provide an improved shift device for actuating a gear or the like, and in which cooperating detent elements act to hold or urge the gear into one of its available settings and prevent the same from remaining in an intermediate or partially engaged position.

A further object of my invention is to provide an improved shift device of the character mentioned having a shifter for actuating the gear and in which one of the cooperating detent elements is a plunger arranged in a recess or chamber of the shifter and yieldingly pressed against another of the detent elements for urging the shifter toward, or holding the same in, a position corresponding with one of the gear settings.

Yet another object of my invention is to provide an improved shift device, of the type referred to, in which the plunger is capable of rocking or tilting movement during its cooperation with the other detent elements.

The invention may be further briefly summarized as consisting in certain novel combinations and arrangements of parts hereinafter described and particularly set out in the appended claims.

In the accompanying sheets of drawings,

Fig. 1 is a partial vertical sectional view taken through a housing member or gear carrier and showing my shift device applied thereto;

Fig. 2 is another partial vertical sectional view illustrating my shift device, but taken at substantially right-angles to the sectional view of Fig. 1;

Fig. 3 is a partial sectional view similar to that of Fig. 2, but showing the shifter in a different position;

Fig. 4 is a partial transverse sectional view taken on line 4—4 of Fig. 1 and showing the spring-pressed plunger in end elevation; and Fig. 5 is another partial sectional view taken on line 5—5 of Fig. 1 and illustrating a detail feature of the device.

As above indicated, my improved shift device is well suited for use in shifting the movable gear of a two-speed axle and in the embodiment of my invention illustrated in the accompanying drawings, I show my shift device applied to this use. More detailed reference will now be made to the drawings for the purpose of describing the embodiment of the invention here illustrated, but before proceeding with the detailed description, it should be understood that my improved shifter may be applied to various mechanisms and uses other than the shifting of the gear of the two-speed axle herein mentioned.

In Figs. 1 and 2 of the drawings I show a housing member or gear carrier 10, which may form a part of a two-speed axle or some other mechanism with which my improved shifter is to be used. The member to be shifted is, in this instance, a sun gear 11 which is shiftable axially by positively actuated means to one or the other of two available positions or settings corresponding with the high and low gear ratios of the two-speed axle. It is often desirable, as in the case of the two-speed axle herein mentioned, that the gear or member to be shifted always be in full engagement in one or the other of its available settings and that it be prevented from remaining in neutral or partially engaged position, and my improved shift device, now to be described, functions in a manner to accomplish this desired result and also enables the operator to maintain a desired "feel" or control over the shift until partial engagement of the gear has been brought about.

My improved shift device includes a shifter 12 which may be in the form of a lever splined to an actuating shaft 13 which is rockably journaled in the housing member 10. This shifter lever may have a depending forked portion or arm 14 for operative connection with the gear 11 and an oppositely projecting arm 15 having an axially extending chamber or recess 16 therein. The forked arm 14 may carry a pair of laterally spaced rollers 17 which engage in the annular groove 18 of a spool portion 19 formed on or connected with the gear 11. The actuating shaft 13 projects from the housing member 10 and may have an arm or lever 20 thereon with which an actuating rod or link may be connected to impart rocking movement to the shaft 13 to thereby shift the gear 11 from one of its available positions to the other. The shaft 13 may be held against axial withdrawal from the housing member 10 by the engagement of an extension 22 of the screw 23 in an annular groove 24 provided on the shaft adjacent its inner end.

The hollow arm 15 of the shifter 12 may project into a hollow housing section 26 which, in this instance, is in the form of a cup-like cover connected to the housing member 10 by the screws 23 and 23a. A plunger 27, located in the chamber or recess 16, serves as a detent element which cooperates with other detent elements provided on the cover 26 for urging the shifter 12 toward one or the other of its positions and holding the gear 11 in full engagement in either of the positions to which it has been shifted. The other detent elements referred to as being provided on the cover 26 may be in the form of recesses 28 and 29 formed on the cover 26 so as to correspond in location with the two available positions or settings of the gear 11. The recess 28 corresponds with the high gear position of the gear 11, in which the gear is shown in full lines of Fig. 2, and the recess 29 corresonds with the low gear position, represented by the broken line position in which the forked arm 14 of the shifter is shown in Fig. 2. In other words, when the gear 11 is shifted into full engagement in its high gear position, the plunger 27 will engage in the recess 28 and when the gear is shifted into full engagement in its low gear position, the plunger will engage in the recess 29.

As mentioned above, it is desirable to prevent the shifter 12 and the gear 11 from remaining in an intermediate or neutral position and I therefore provide a compression spring 30 in the chamber 16 which constantly acts on the plunger urging the same outward toward engagement in one of the recesses 28 and 29. To this end I also provide for a rocking or tilting of the plunger 27 in the chamber 16, as will be presently explained, and form the cooperating detent elements of such shape as to enable the spring 30 to force the plunger 27 into one of the recesses 28 and 29 and to shift the gear 11 into full engagement in one or the other of its positions to which it may have been partially moved.

To provide for the tilting movement of the plunger 27 just referred to, I form the plunger of a smaller cross-sectional size than the chamber 16 so that when the plunger has been forced inwardly of the chamber its outer end can tilt or rock to a relatively inclined position, as shown in Fig. 3. To facilitate this tilting of the plunger I may provide the arm 15 with a pin 31 extending transversely through the chamber 16 and may provide the inner end of the plunger with slots 32 for guiding and pivotal engagement with the pin. As shown in the drawings, the plunger 27 may be hollow and the compression spring 30 may be arranged within the plunger with its inner end seating against the pin 31. When the plunger 27 is forced to its outer position by the spring 30 it is desirable that the plunger be held substantially coaxial with the chamber 16 and for this purpose I provide a guide ring 33 in the outer end of the chamber having an opening 34 of a smaller size than the chamber and in which the plunger 27 is slidable.

For obtaining the desired cooperation between the detent elements I form the plunger 27 with a bevelled outer end 27a of chisel-like or wedge-like shape and form the recesses 28 and 29 of corresponding wedge-like shape with a ridge 35 between these recesses. The ridge 35 has bevelled or oppositely inclined sides 35a and 35b which slope toward or extend into the recesses 28 and 29, respectively. Although the housing member or cover 26 having the detent elements 28 and 29 thereon may be of any suitable construction, I find it desirable to form this member as a sheet metal stamping and to provide the recesses 28 and 29 and the ridge 35 thereon by indenting the same into the bottom wall of this member.

To facilitate the lubrication of the plunger 27 in the chamber 16, and to prevent the building up of pressure therein as the plunger is operated, I may provide the arm 15 with a suitable opening 36 which connects the chamber 16 with the interior of the housing in which the shifter is arranged.

During the operation of my improved shift device the shaft 13 is rocked by the lever 20 to swing the shifter 12 and thereby shift the gear 11 to either the high gear or low gear setting mentioned above. This swinging of the shifter 12 causes the bevelled outer end of the plunger 27 to travel up one of the inclined sides of the ridge 35, for example the side 35a when the shifter is rocked in a clockwise direction as seen in Fig. 2, and the plunger is thereby forced inwardly of the chamber 16 against the action of the spring 30. As the plunger is thus forced into the chamber 16 its bevelled end is withdrawn from the guide ring 33 and the plunger is rocked or inclined to the left to a position such as that illustrated in Fig. 3. If the shaft 13 is not rocked through a sufficient angular distance to cause the tip of the plunger 27 to ride over the point or apex of the ridge 35, the spring 30 will cause the plunger to reengage itself in the recess 28 and will swing the shifter 12 back to a corresponding position thereby causing the gear 11 to be maintained in full engagement in its full-line position shown in Fig. 2. However, if the shaft 13 is rocked far enough to cause the tip of the plunger to ride over the apex of the ridge 35, the spring 30 will then force the plunger into the recess 29 and in so doing will swing the shifter to a corresponding position and will cause full engagement of the gear 11 in the setting corresponding with the broken-line position shown in Fig. 2 for the shifter arm 14. In this way my improved shift device will operate to prevent the operator from shifting the gear 11 into only partial engagement or leaving the same in a neutral position. It will be understood, of course, that if the operator rocks the shaft 13 through the necessary distance to cause full engagement of the gear 11 in either of its settings, the plunger 27 will simply move out of one recess and will ride over the ridge 35 into the other recess and will thereafter serve as a holding means for retaining the gear in full engagement in the setting to which it has been shifted.

In the functioning of my shift device, as above explained, it will be observed that as the plunger 27 rides up one of the inclined sides 35a and 35b and thereby compresses the spring 30, a load is imposed which yieldingly resists the shifting of the gear 11 by the operator and enables him to maintain a desired "feel" or control over the shift. The parts of my improved device are so constructed and arranged that partial engagement of the gear 11 will occur for both of its settings, just before the tip of the plunger 27 rides over the apex of the ridge 35. Thus during the shifting of the gear 11 into partial engagement control is maintained by the operator but after partial engagement has occurred and the tip of the plunger has passed over the ridge 35, the shifting of the gear into full engagement will be facilitated or automatically completed by the expansive force of the spring 30.

From the foregoing description and the accompanying drawings, it will now be readily seen that I have provided an improved shift device which is well suited for use on a two-speed axle, but which can also be used with various other mechanisms. It will be seen also that my improved shifter embodies a compression spring and cooperating detent elements which operate so as to cause the gear being shifted to always be moved into full engagement and prevent the gear from being left in a neutral or partially engaged position.

While I have illustrated and described the improved shift device of my invention in a more or less detailed manner, it will be understood, of course, that I do not wish to be limited to the particular construction, arrangement and application herein disclosed, but regarded my invention as including such changes, modifications and adaptations as do not involve a departure from the spirit of the invention and the scope of the appended claims.

Having thus described my invention, I claim:

1. In apparatus for shifting a movable part from one position to another, a housing, a shifter movable in said housing and having operative connection with the part to be shifted, means for actuating the shifter to cause the desired shifting of said part, and cooperating detent elements on said housing and shifter for urging the latter toward one or the other of said positions, said detent elements comprising a ridged portion, a hollow portion adjacent thereto and a spring-pressed plunger shiftable in said hollow portion and adapted to ride over the ridged portion, the plunger being of smaller size than the recess of said hollow portion and being rockable in the latter when shifted inwardly thereof.

2. In apparatus of the character described, a housing, a shifter movable therein from one position to another and having a recessed arm portion, positioning means on the housing adjacent which said recessed arm portion is movable, said positioning means having recesses therein corresponding with the positions to which the shifter is movable and an oppositely bevelled projection separating said recesses, and a spring-pressed plunger in said recessed arm portion and having a bevelled outer end engaging said positioning means, said plunger being of smaller size than the recess of said arm portion and being rockable in the latter recess when shifted inwardly thereof.

3. In apparatus of the character described, a housing, a shifter movable therein from one position to another and having a recessed arm portion, positioning means on the housing adjacent which said recessed arm portion is movable, said positioning means having recesses therein corresponding with the positions to which the shifter is movable and an oppositely bevelled projection separating said recesses, a spring-pressed plunger in said recessed arm portion and having a bevelled outer end engaging said positioning means, said plunger being of smaller size than the recess of said arm portion and being rockable in the latter recess when shifted inwardly thereof, and guide means for the plunger adjacent the outer end of said arm portion and of a size to hold the plunger substantially coaxial of the arm portion recess when the plunger is in an extended position.

4. In a shift device of the character described, a pivoted shifter lever having a projecting arm provided with a recess, a housing having a hollow portion into which said arm projects, a pair of spaced shifter-positioning recesses on said housing portion separated by a relatively sharp-edged ridge having sides sloping toward said spaced recesses, a plunger in the recess of said arm having a bevelled outer end adapted to ride over said ridge upon swinging of the shifter, and a spring urging the bevelled end of the plunger outward against one of the sloping sides of said ridge to thereby cause the shifter to be moved to a position substantially in alignment with one of said recesses, said plunger being of smaller size than the recess of said arm and being rockable therein when shifted inwardly of the arm.

5. In a shift device of the character described, a pivoted shifter lever having a projecting arm provided with a recess, a housing having a hollow portion into which said arm projects, a pair of spaced shifter-positioning recesses on said housing portion separated by a relatively sharp-edged ridge having sides sloping toward said spaced recesses, a plunger in the recess of said arm and adapted to ride over said ridge upon swinging of the shifter, and a spring urging the plunger outward against one of the sloping sides of said ridge to thereby cause the shifter to be moved to a position substantially in alignment with one of said recesses, said hollow housing portion being in the form of a hollow sheet metal cover having said ridge and spaced recesses indented in the wall thereof.

ROBERT C. RUSSELL.